Oct. 24, 1967 G. C. ROINESTAD 3,348,659
CONVEYOR SYSTEM
Filed April 19, 1967 11 Sheets-Sheet 8

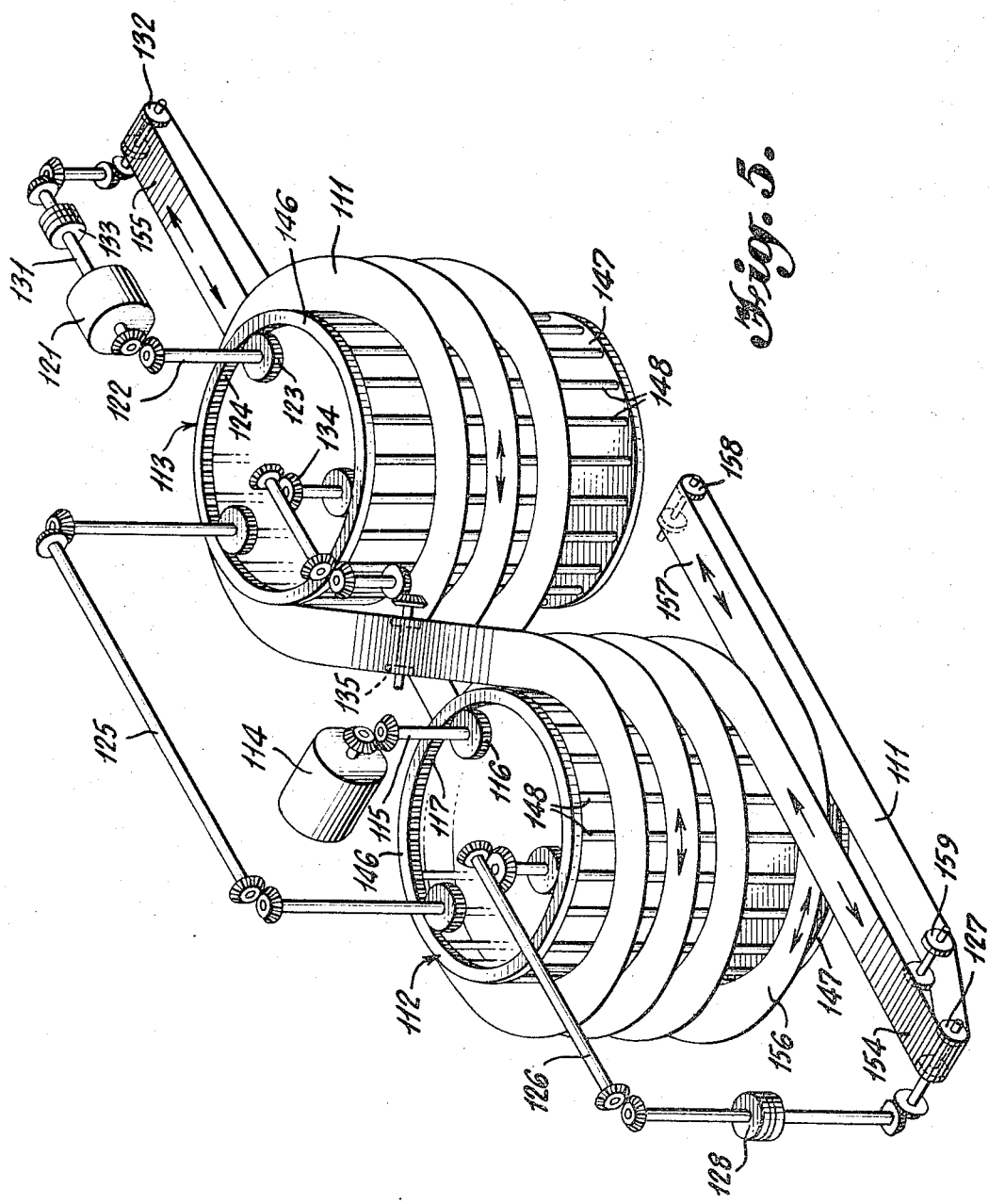

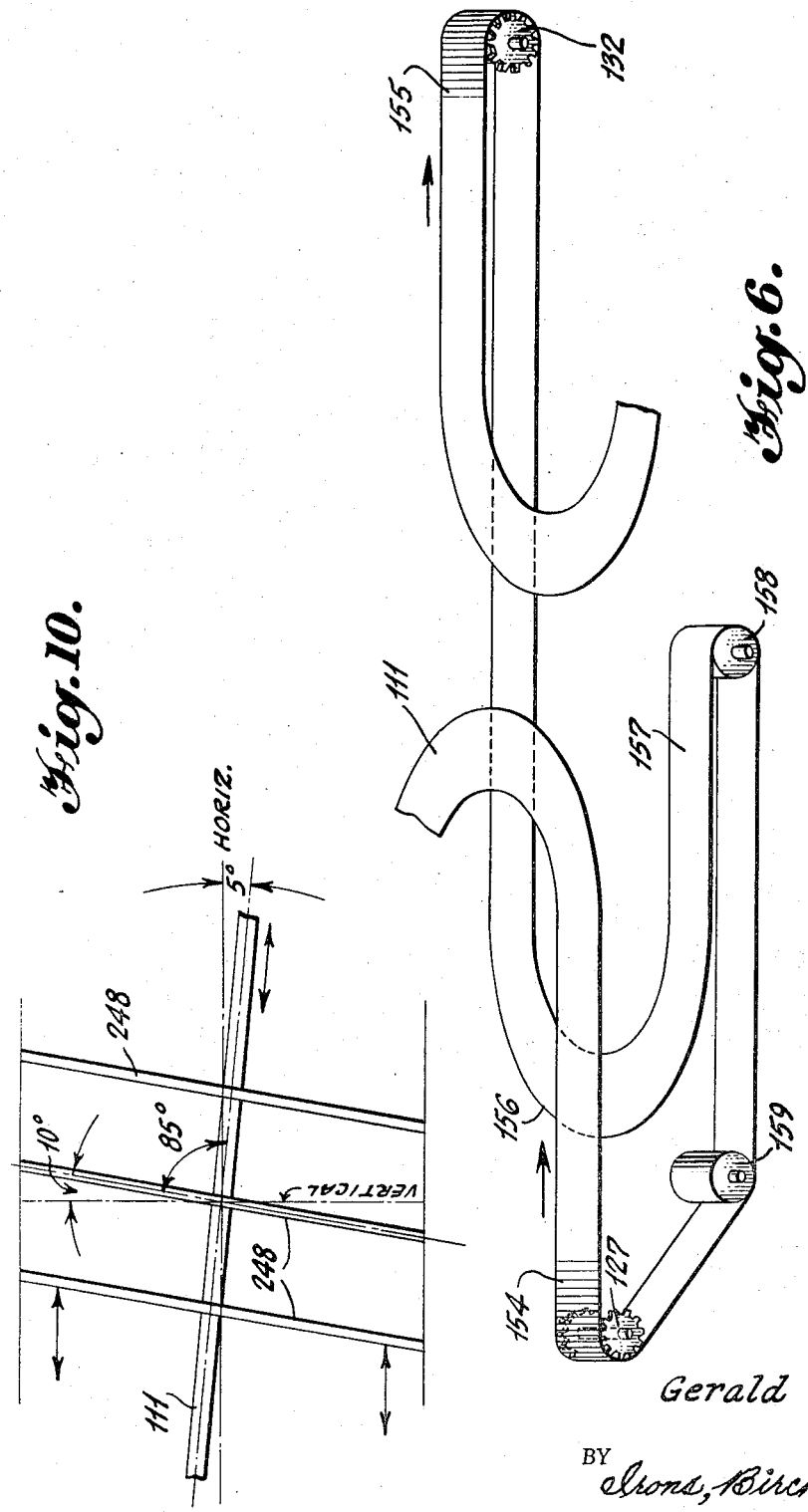

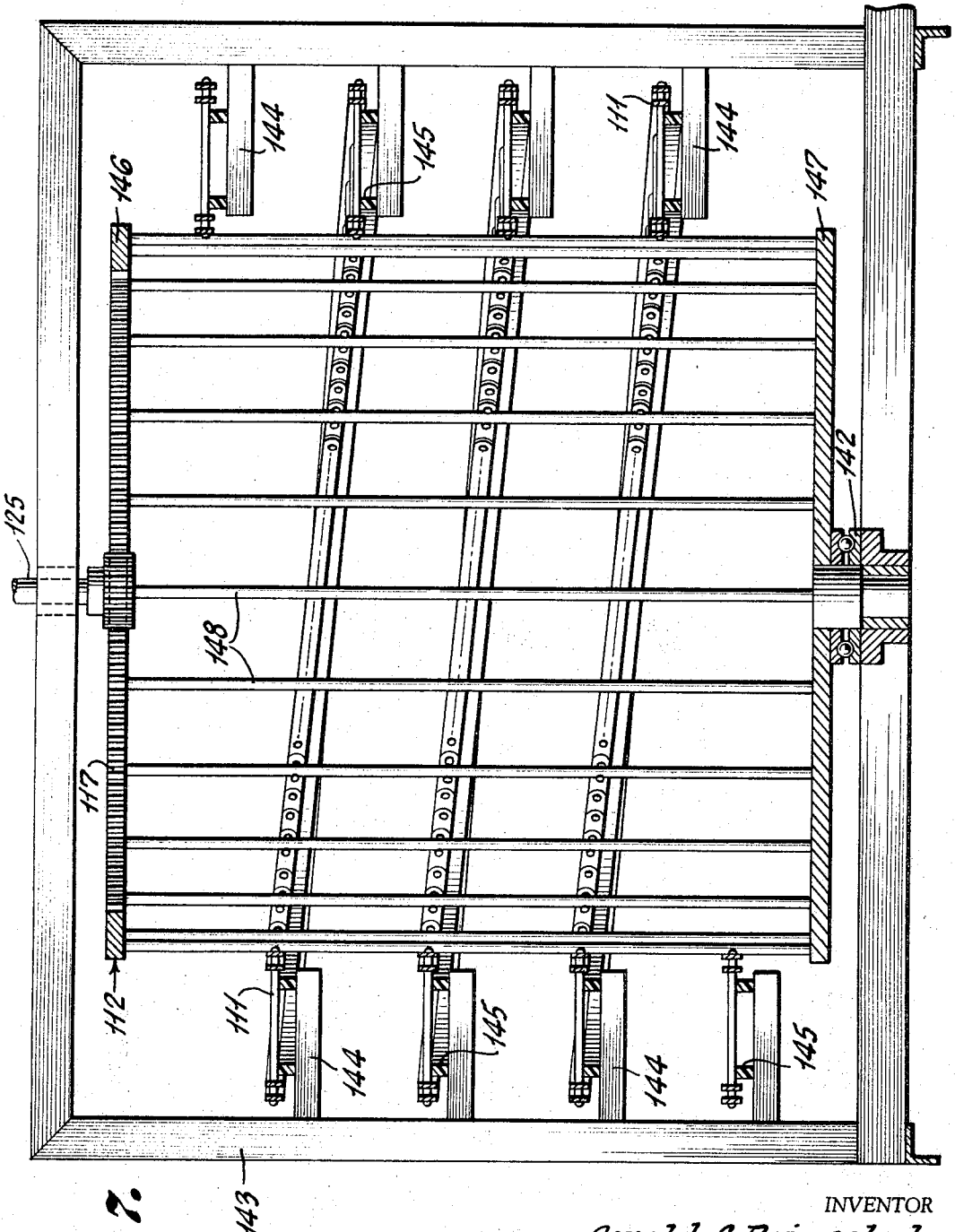

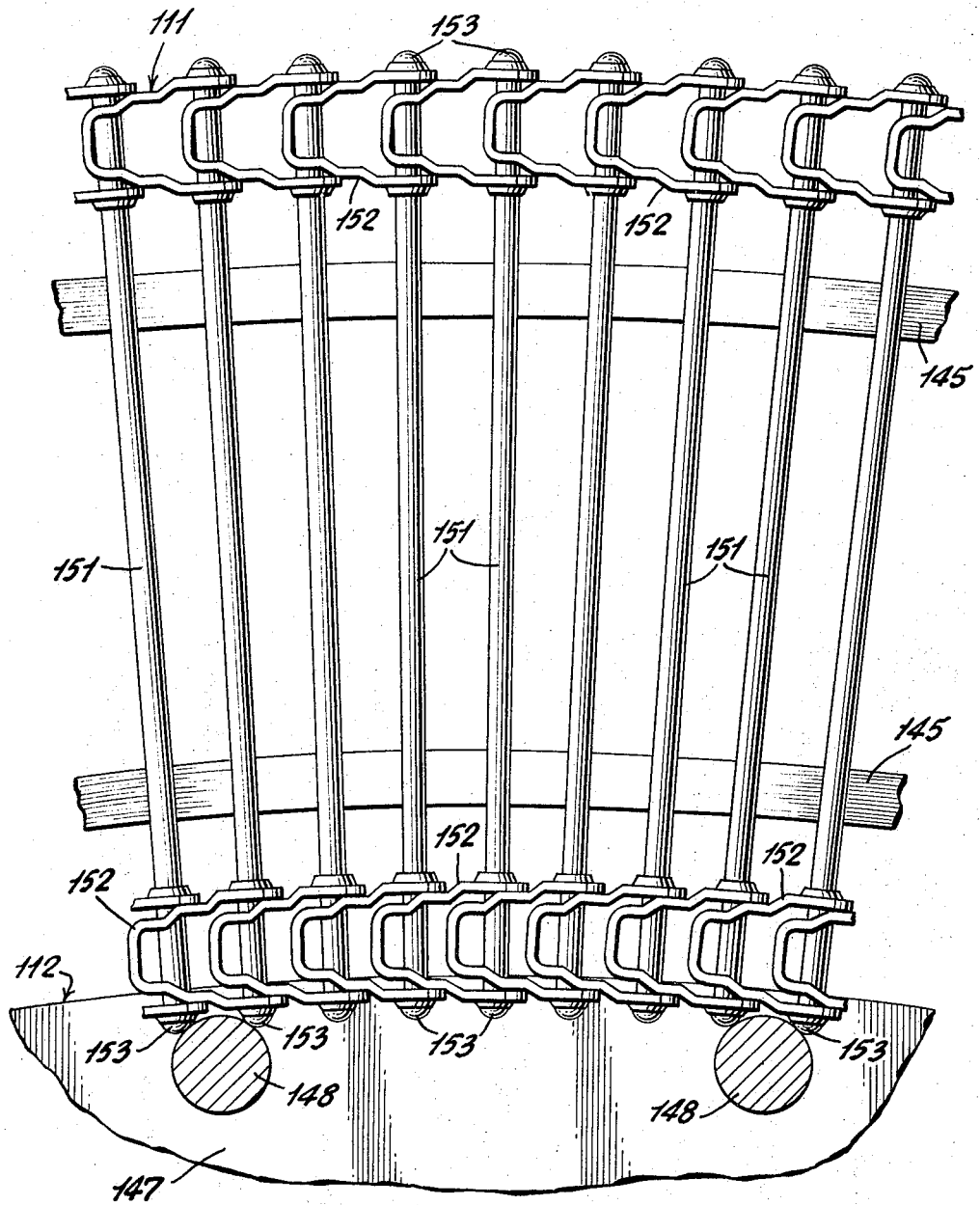

INVENTOR
Gerald C. Roinestad

BY Irons, Birch, Swindler & McKie
ATTORNEYS

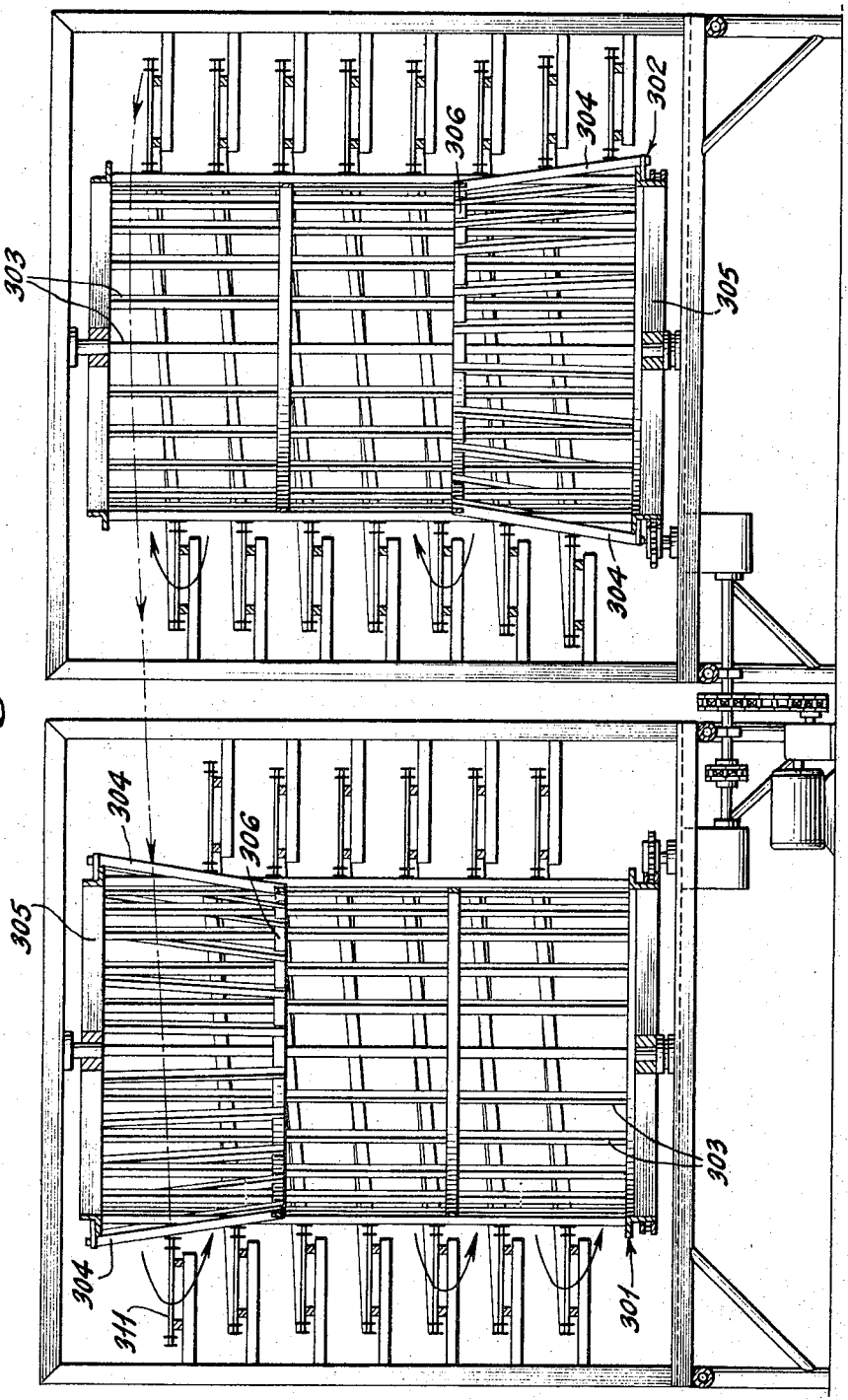

INVENTOR
GERALD C. ROINESTAD

Oct. 24, 1967  G. C. ROINESTAD  3,348,659
CONVEYOR SYSTEM
Filed April 19, 1967  11 Sheets-Sheet 11

INVENTOR
GERALD C. ROINESTAD

BY
*Irons, Birch, Swindler & McKie*
ATTORNEYS

United States Patent Office 3,348,659
Patented Oct. 24, 1967

3,348,659
CONVEYOR SYSTEM
Gerald C. Roinestad, Winchester, Va., assignor to Ashworth Bros., Inc., Fall River, Mass., a corporation of Massachusetts
Filed Apr. 19, 1967, Ser. No. 634,032
42 Claims. (Cl. 198—136)

ABSTRACT OF THE DISCLOSURE

A conveyor system including an endless flat belt capable of bending in an edgewise direction and a supporting and driving assembly which supports the belt in a helical path having a plurality of vertically spaced loops and frictionally drives the belt at a plurality of locations along the inner edge of the loops, the driving being controlled to prevent elevation of one edge of the belt relative to the other edge.

*Cross reference to related applications*

This is a continuation-in-part of my co-pending application Ser. No. 507,982, filed Oct. 22, 1965 which in turn is a continuation-in-part of my co-pending application Ser. No. 432,625, filed Feb. 15, 1965, and now abandoned.

*Background of the invention*

Field of the invention

This invention relates to endless conveyor belt systems and more particularly such systems utilizing metallic belts capable of negotiating edgewise horizontal curves.

*The state of the prior art*

In various situations it is desirable to provide a great length of endless conveyor belt in a relatively small space. For example, in freezing, cooling or heating rooms a relatively long conveyor may retain articles to be brought to the requisite temperature in a single conveying cycle. Similarly, high capacity storage conveyors are utilized adjoining assembly lines. In such situations, it is a common practice to pass the belt around a series of vertically spaced loops to afford maximum conveyor length in a minimum space. A major contribution to the commercial feasibility of this type of conveyor system was the development of effective metallic belts capable of negotiating edgewise horizontal curves.

A major problem in conveyor systems of the character described has involved the tension in the belts. Movement of the belt around the numerous horizontal loops tends to result not only in high belt tension but in non-uniform belt tension. Disadvantages which follow include increased belt wear, excessive power requirements and a tendency for the articles being conveyed to be shifted about on the surface of the belt.

*Summary of the invention*

To overcome the disadvantages of the prior art, it is an object of this invention to provide an improved conveyor system of the type utilizing metallic belts which negotiate edgewise turns in a series of loops.

A further object of the invention is to provide such a system in which the belt may be smoothly and economically driven under low tension.

Another object of the invention is to provide an improved conveyor system in which the opposing flat surfaces of the belt may be reversed with each cycle of operation.

Generally, one aspect of the invention relates to a conveyor system which comprises an endless flat belt made up of a plurality of links collapsibly connected together to permit the belt to bend in an edgewise direction, and a belt driving and supporting assembly. Such assembly includes rotatable friction driving means comprising an upright drum having a circular cross section and a peripheral driving surface, supporting means engaging the underside of said belt to support said belt for helical movement curving edgewise around said drum successively through a plurality of vertically spaced loops contiguous to said drum throughout their length, the radially inner edge of said belt being in sliding frictional engagement with said driving surface, and supplemental driving means engaging said belt. The driving and supporting assembly together provide a tension control means with said drum driving surface having a coefficient of friction relative to said belt correlated with the coefficient of friction of said supporting means relative to said belt to maintain said belt throughout said loops at a magnitude of tension less than the tension which would cause one edge of the belt to be raised above the other edge and with said supplemental driving means maintaining said magnitude of tension sufficient to permit the belt to be smoothly driven by said drum by frictional engagement between said driving surface and the radially inner edge of the belt at a speed slightly less than the speed of the contiguous drum surface and feeding the belt to an initial point in its path through said loops at a tension not greater than said magnitude.

In terms of method the invention includes a series of steps for driving an endless flat belt made up of a plurality of links collapsibly connected together to permit the belt to bend in an edgewise direction. Such steps include applying a frictional drag to the undersurface of said belt and supporting said belt along said undersurface in a helical configuration with the belt curving edgewise in a plurality of vertically spaced loops so that the radially inner edges of said loops define substantially a cylinder. There is also the step of applying a frictional driving force in a direction circumferentially of said cylinder to the radially inner edge of said belt substantially continuously throughout the length of said loops to move said belt longitudinally through said loops. There is the further step of applying a supplemental driving force to said belt. Very importantly the method requires correlating said frictional driving force with said frictional drag to maintain said belt under a driving tension less than the tension which would cause one edge of the belt to be raised above the other edge. To that end the belt is fed to an initial point in its path through said loops at a tension not greater than said driving tension.

The invention is particularly advantageous where the belt is moved in its helical path supported along its undersurface by helical rails around a pair of horizontally spaced upright driving drums with the belt passing up one drum and down the other. Preferably the surface of each drum is defined by a plurality of spaced vertical rods which engage the edge of the belt.

In accordance with the invention, not only is a great length of belt placed in a small space but a serious problem in driving great lengths of belt is overcome. In the usual pulley driven belt the tension created in the belt is a function of belt length. Using this invention, however, the tension on the belt is kept at a low level which is wholly independent of belt length. This result is achieved by the substantially continuous frictional drive along the edge of the belt as opposed to a drive at a single point or a few widely separated points. At the same time the frictional edge driving of the belt through a series of helically curved loops gives rise to other problems. Such problems heretofore have not been overcome and systems of this general type have been unsuccessful.

The drum surface which provides the frictional edge drive should move slightly faster than the belt surface.

With this slight overdrive the belt should slip smoothly backward relative to the drum. There is a tendency, however, for the belt to hang up or become cinched momentarily on the drum and thus travel at the same speed as the drum. This occurrence causes a sudden increase in tension and prevents smooth operation. If the belt is travelling up the drum the outer edge of the belt is lifted. If the belt is moving down the drum, the inner edge of the belt hangs up against the drum and is lifted. Alternate sticking and slipping of the belt on the drum can set up vibration waves which can seriously disrupt the articles on the belt and even damage the system. As long as tension in the belt is sufficiently low, the belt will slip backwards over the drum smoothly. When tension rises above a critical level, however, the belt will hang up or cinch on the drum which thus gives rise to the difficulty mentioned. Normally, the first sign that the critical tension has been reached is the elevation of one belt edge. In any given system that critical tension can be determined by trial and error.

The use of mechanical hold-down devices to physically block such elevation of the belt edge is quite undesirable. Such a hold-down device adds greatly to the expense of the system, particularly when installed along the inner edge of the belt. Moreover, such hold-down devices add to the frictional drag against the belt and thus substantially increase the tension in the system. The increased tension compounds the problems encountered. It is an important aspect of the present invention to control belt tension and to maintain it below the tension which causes one edge of the belt to be raised above the other, thus eliminating the necessity for mechanical hold-down devices.

Tension at any point in the friction drive conveyor system of the present invention may be computed by the formula $$T_2 = \frac{T_1}{e^{Fa}} + rw\frac{f}{F}\frac{e^{Fa}-1}{e^{Fa}}$$

For the purposes of the formula, $T_2$ is the belt tension at any particular point along the length of the belt; $T_1$ is the belt tension at the initial point in the system where the belt first engages the drum surface; $r$ is the outside radius of the belt loops, i.e., the distance from the axis of the drum to the outer edge of the belt; $w$ is the weight of the belt and its load per linear unit of fully extended belt; $a$ is the angular movement in radians of the belt from the initial point to the point where $T_2$ is to be determined; $F$ is the apparent coefficient of friction between the drum surface and the radially inner edge of the belt; $f$ is the apparent coefficient of friction between the belt supporting rails and the undersurface of the belt which they engage; $e$ is the natural logarithmic base.

As stated, the above formula is applicable where the belt is frictionally driven with concomitant slippage between the driving surface and the belt. The initial tension $T_1$ must be sufficiently low to permit initial driving with such slippage. To that end, the belt is fed to its initial contact with the drum surface under zero or close to zero tension. At such initial point, $a$ is zero and, under the formula, $T_2$ is equal to $T_1$ which is very small. Further, at zero $a$ the term $T_1/e^{Fa}$ is equal to $T_1$ and therefore is very small. Such term grows even smaller and approaches zero as $a$ increases. Thus as a practical matter the term can be ignored in determining the value of $T_2$ at any point.

Similarly, the term $$\frac{e^{Fa}-1}{e^{Fa}}$$

can be ignored. Since the belt is to be frictionally driven with only slight slippage, F must have a substantial value. As $a$ increases, the term $e^{Fa}$ increases very rapidly. Accordingly, the term $$\frac{e^{Fa}-1}{e^{Fa}}$$

rapidly approaches one.

Since the two terms discussed above may be essentially ignored, the value of $T_2$ at any point is approximately equal to $rw(f)/(F)$.

It is therefore apparent that for any given loop radius and unit weight of belt, the magnitude of $T_2$ may be controlled by correlation of the coefficients of friction $f$ and $F$. Specifically, the value of $T_2$ is decreased as the ratio $f/F$ decreases. By selection of a relatively high F and a relatively low $f$, one can keep $T_2$ at a low level which remains constant regardless of the length of the belt. As previously stated, $T_2$ must be maintained below the tension at which the outer edge of the belt will tend to elevate when the belt is going up or the inner edge of the belt will tend to elevate as the belt is going down. The critical maximum $T_2$ value can be determined by trial and error in any particular system. By correlation of the coefficients of friction $f$ and F, $T_2$ can be maintained below that critical maximum. At the same time $T_2$ must be and can be kept sufficiently high to insure adequate engagement between the driving drum and the belt to enable driving to be accomplished.

An advantageous specific feature of the invention is the use of a reversing pulley about which the belt makes a flatwise 180° turn. The belt makes a first edgewise turn from its normal path in the conveyor system to approach the reversing pulley and a second edgewise turn departing from said reversing pulley to resume the normal belt path. The edgewise turns of the belt approaching and departing from the reversing pulley are made at about the same elevation in the conveyor system. The purpose of the reversing pulley is to cause the opposed flat surfaces of the belt to be reversed with each successive conveying run. It is common in conveying systems to pass a belt over an even number, usually two, pulleys to reverse the direction of travel of the belt at the ends of a straight run of the belt. It will be understood that the reversing pulley is employed either alone or in addition to the conventional even number of pulleys.

*Brief description of the drawings*

The invention having been generally described, specific embodiments will now be set forth in detail with reference to the accompanying drawings in which:

FIGURE 4 is an elevational view of a modified embodiment of the invention;

FIGURE 5 is a perspective view of a further modified conveyor system according to the present invention;

FIGURE 6 is a perspective view of the lower portion of such modified conveyor system showing the loading and discharge stations and the positive tension drive;

FIGURE 7 is a vertical section taken through one of the cylindrical driving drums of the modified conveyor system;

FIGURE 8 is a fragmentary plan view partially in section showing the structure of the conveyor belt and its engagement with the supporting trackway and the driving rods of the drum;

FIGURE 10 is a developed view of three of the inclined driving rods showing their relationship with the edge of the belt;

FIGURE 11 is a vertical sectional view of another modification of the driving drums;

Figure 1:
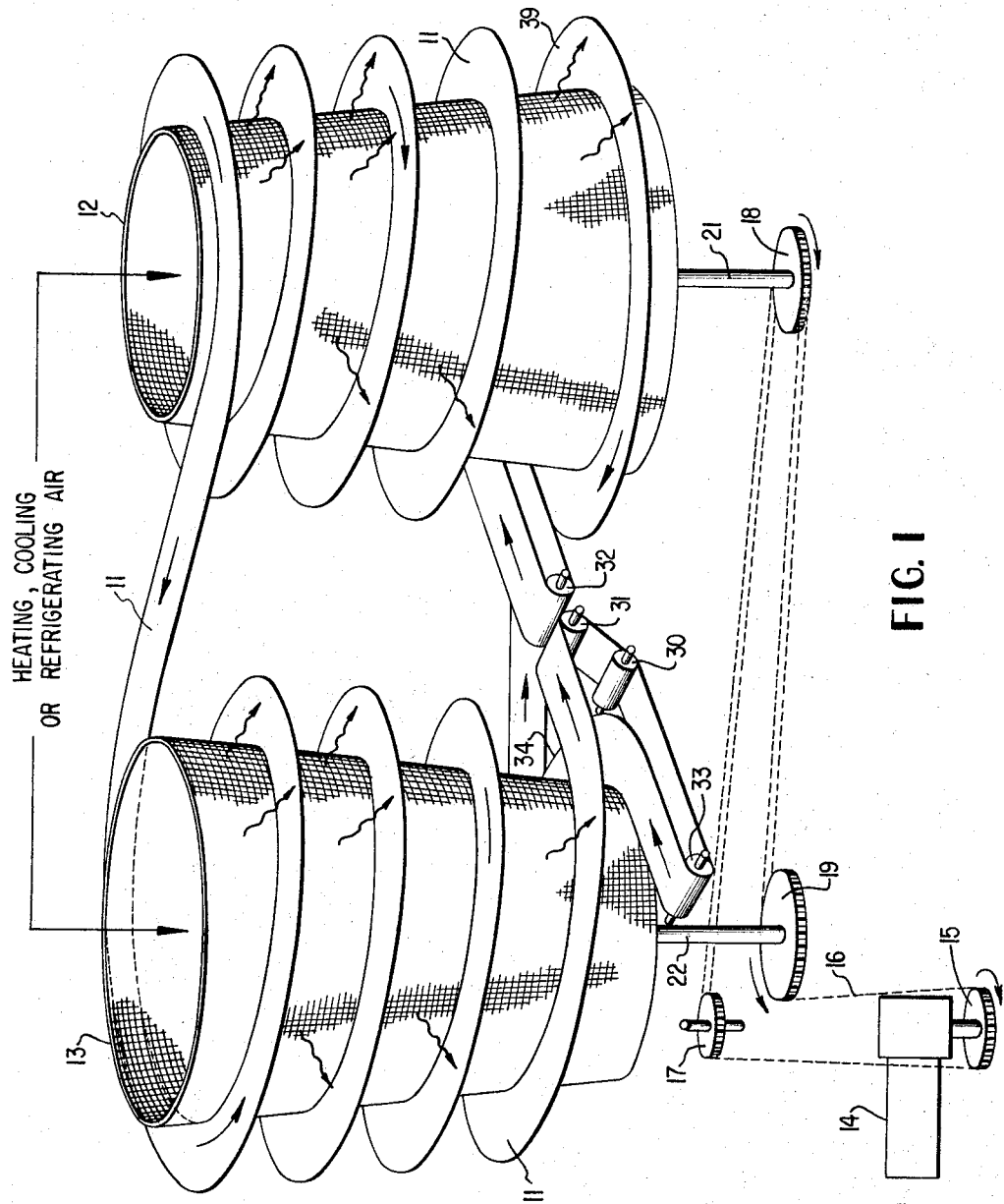
FIGURE 1 is a perspective view of a conveyor system according to the present invention.
Figure 3:
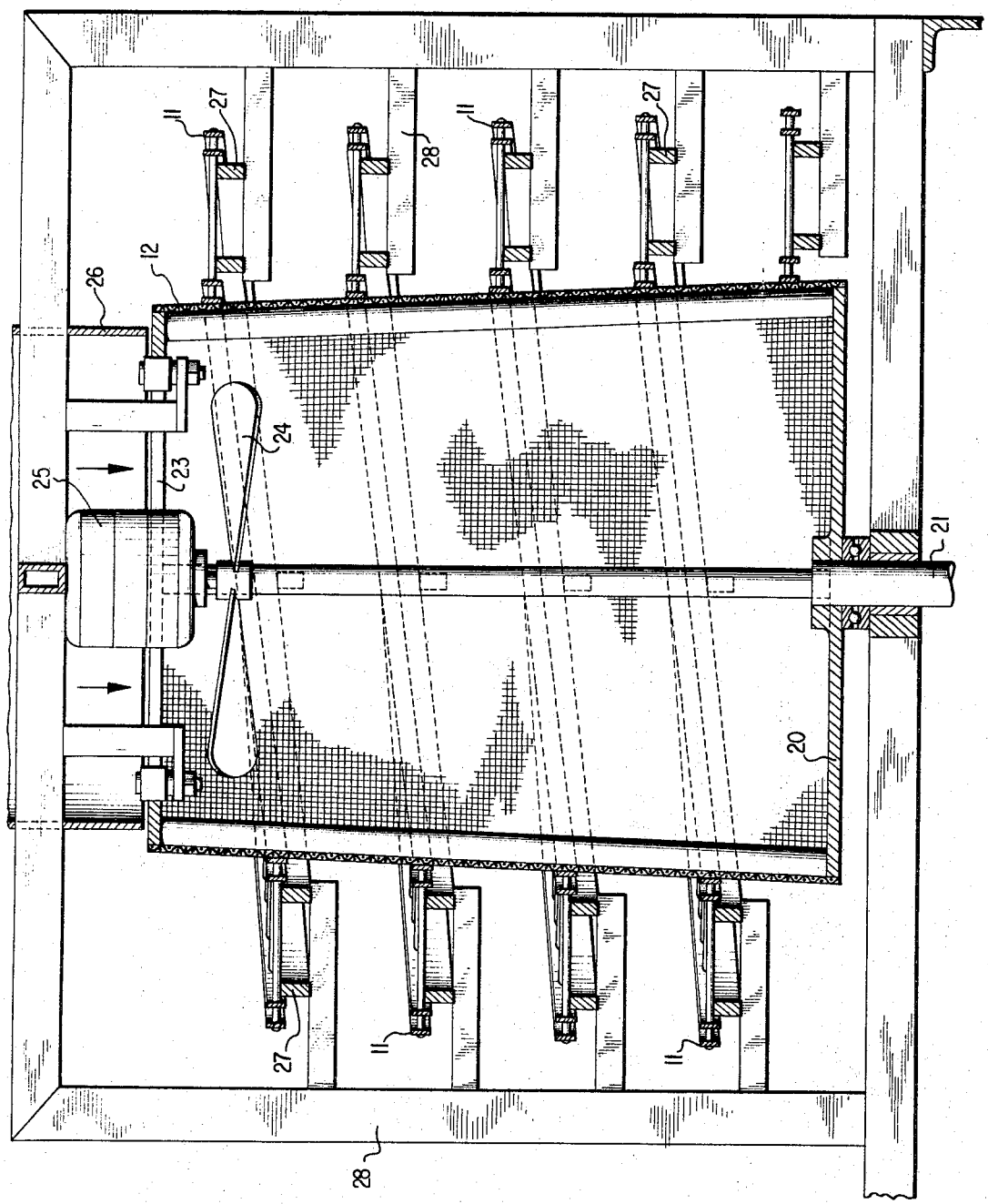
FIGURE 3 is a vertical section taken through one of the frusto-conical driving drums.

Depicted in FIGURE 1 is a conveyor system utilizing an endless conveyor belt 11. The belt 11 may be any of several commercially available belts made of metallic links collapsibly connected together to enable the belt to bend in either edgewise direction. Thus the belt may negotiate either straight runs or edgewise curves. The belt 11 shown in FIGURE 3 is disclosed in greater detail in Roinestad Patent No. 3,225,898. Other belts which may be employed are shown in Roinestad Patent No. 3,261,451 and in Bechtel Patent 2,872,023.

The belt 11 is arranged in the system to negotiate a plurality of vertically spaced loops so that a maximum length of belt may be employed in a minimum space. Belt 11 is passed in a helical configuration successively around each of a pair of upright frusto-conical driving drums 12 and 13. Each of the drums is tapered in the direction of belt travel axially of the drum. Since the belt moves upwardly along the drum 12, that drum is tapered upwardly. Since the belt moves downwardly along the drum 13, that drum is tapered downwardly.

The drums 12 and 13 are driven by an electric motor 14 which rotates a sprocket 15 which in turn drives a chain 16 shown in dotted lines in FIGURE 1. The chain passes successively over an idler sprocket 17 and a pair of drive sprocket 18 and 19 which are connected to the drums 12 and 13, respectively, by shafts 21 and 22. With reference to FIGURE 3, the shaft 21 is connected to the peripheral surface of the drum 12 by spiders 20 and 23 or other suitable connections. The operation of the driving drums will be described in more detail hereinafter.

The peripheral surface of the drum 12 is perforated as best shown in FIGURE 3. Preferably such peripheral surface is comprised of a heavy wire mesh of bronze or similar metal. Because of the perforations, a stream of air may be blown from the interior of the drum through the perforated surface over the loops of the conveyor as it passes helically around the drum surface. As shown in FIGURE 3, a fan 24, driven by a motor 25, is mounted in the top of the drum 12 to blow air downwardly into the drum. Also shown in FIGURE 3 is a conduit 26, which may be employed to transmit heated or refrigerated air to the drum to be blown over the conveyor surface. In situations where ambient air is blown over the conveyor the conduit 26 is not needed.

The structure of the drum 13 and its connection to the shaft 22 is identical to that of the drum 12 except that the drum 13 is tapered in the opposite direction. A fan and conduit may be mounted in the top of the drum 13 precisely as illustrated with respect to the drum 12.

The conveyor belt 11 is supported in its passage around the conveyor system by a stationary helical trackway 27, as shown in FIGURE 3. Such trackway is in turn mounted on a supporting frame 28, only a portion of which is shown. The track 27 passes helically around each of the drums 12 and 13 and between the two drums to transfer the belt from drum to drum. In operation, the belt slides over the surface of the trackway. If desired, rollers or other anti-friction elements may be mounted on the track to support the belt.

Figure 2:
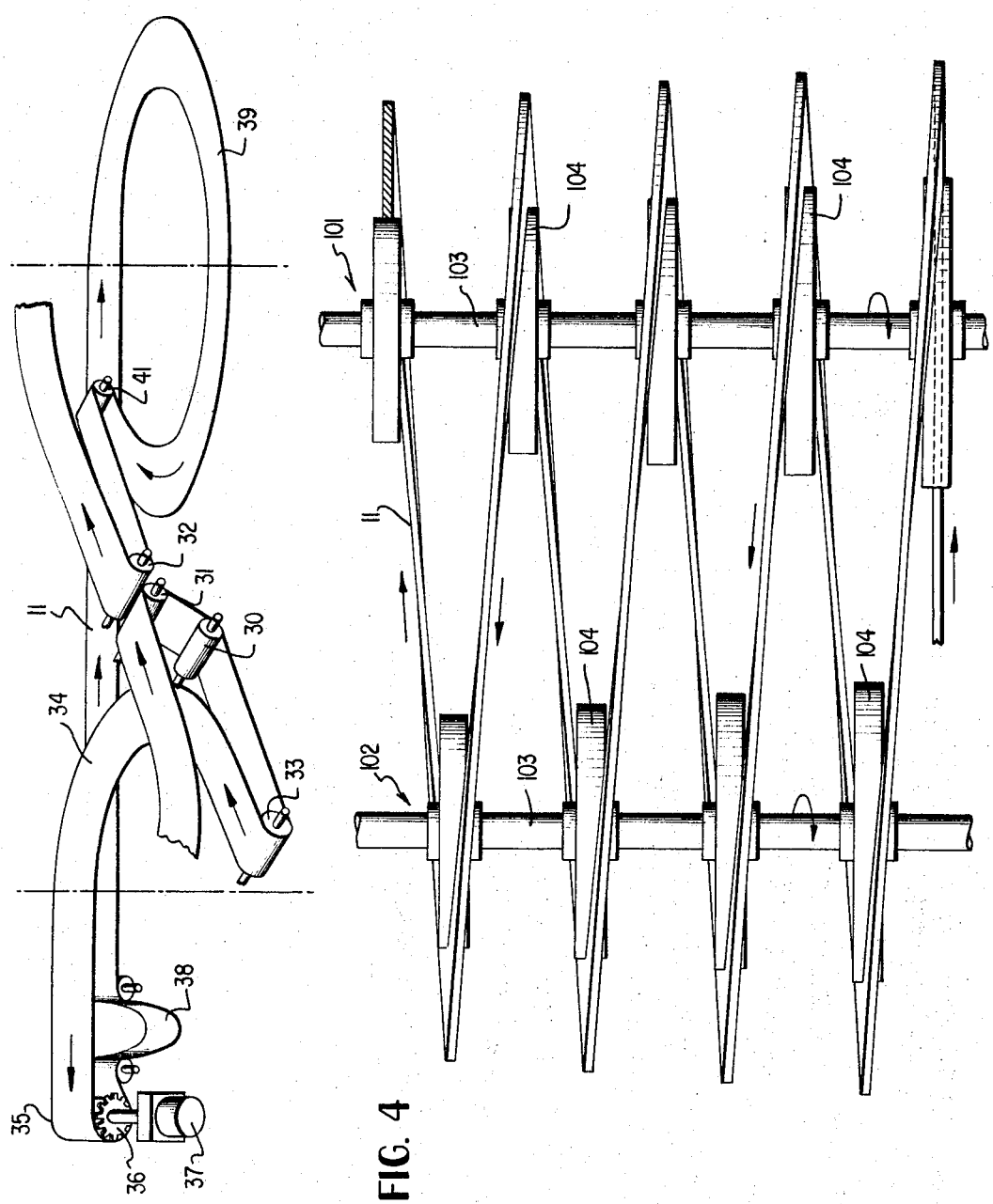
FIGURE 2 is a perspective view of the lower portion of the conveyor system showing the positive tension drive and the reversing pulley arrangement.

The structural arrangement for transmitting the belt from the bottom of the drum 13 to the bottom of the drum 12 is shown in FIGURE 2. That arrangement accomplishes two primary objectives. First, it is desired to provide continuous conveying of articles through successive cycles around the two drums. At the same time, it is desired to reverse the opposing surfaces of the belt with each cycle so that the two surfaces will wear uniformly.

As the belt ends its descending conveying run down the drum 13 it is passed to a transfer point which consists of a pair of closely spaced horizontal pulleys 31 and 32. After passing around the pulley 31 the belt is moved around an idler pulley 30 and again has its direction reversed around the pulley 33. After leaving the pulley 33, the belt is passed edgewise around a horizontal curve 34 in engagement with the bottom peripheral surface of the drum 13 from which it is passed in a 180° flatwise turn around a reversing pulley 35 which also includes a pair of drive sprockets 36 driven by an electric motor 37. The sprockets 36 engage corresponding openings in the opposing edges of the belt in the usual manner.

The belt is then passed through a catenary loop 38 from which it is passed along the bottom peripheral surface of the drum 12 in a second edgewise horizontal curve 39. After negotiating the turn 39 the belt is passed over the pulley 41 back to the transfer point and around the pulley 32 from which it begins its helical conveying run up the driving drum 12. Articles reaching the pulley 31 are transferred directly across to the belt over the pulley 32.

The passage of the belt around the horizontal curve 34, the reversing pulley 35, and the horizontal curve 39 enables the opposing surfaces of the belt to be reversed with each conveying cycle. Thus wear of the belt is distributed between both its surfaces. In order to negotiate the reversing pulley to achieve such surface reversal, it is essential to move the belt around edgewise curves approaching and departing from the reversing pulley. After negotiating pulley 33, the belt is taken out of its normal path in the conveyor system around the horizontal curve 34 to the reversing pulley 35. It resumes its normal path in the conveyor system after it has negotiated the horizontal curve 39 to approach the pulley 41. The curves 34 and 39 and the pulley 33 are all at about the same elevation. Thus the belt resumes its normal path at about the same elevation as it left it.

Many conventional endless belt installations include several pulleys about which the belt makes a flatwise turn to reverse its direction of travel for one reason or another. The reversing pulley of the present invention may be employed with or without such additional pulleys. It is essential, however, that the total number of flatwise direction reversals, including that made around the reversing pulley, must be an odd number. Otherwise the effect of the reversing pulley will be cancelled. In the present system there are four pulleys, 31 (together with 30), 32, 33 and 41 about which the belt changes direction, in addition to the reversing pulley 35.

The drum drives of the present invention are particularly advantageous in combination with a reversing pulley, because the belt is guided around the requisite edgewise curves by the same drums which accomplish the driving. If surface reversal of the belt with each cycle is not desired, the belt could be moved directly from the bottom of the drum 13 to the bottom of the drum 12. Continuous travel of articles through successive cycles then could be effected on the continuous belt surface without a transfer point.

The belt is driven by the combination of the primary driving drums 12 and 13 and the supplemental driving sprockets 36. The drums provide the primary drive. The peripheral surface of each drum engages the radially inner edge of the belt 11 at each of the loops of the belt around the drums. The drive is accomplished by a sliding frictional engagement of the drum with the belt.

The supplemental positive drive supplied by the sprocket 36 imparts a small tension on the belt sufficient to enable it to be frictionally driven by the drums 12 and 13. Without some degree of belt tension, there will be no frictional grip between the drums and the belt. As a consequence it would not be driven. The sprockets 36 move the belt at a speed which is slower than the surface speed of either drum at any point of contact with the belt. Thus there is constant sliding between each drum and the belt. The tension imparted by the sprockets 36 must not exceed the critical tension which will cause one edge of the belt to be elevated above the other. To that end, the coefficients of friction between the drum surfaces and the belt and between the supporting rails of the belt must be correlated as previously described to enable the belt to be driven below the critical tension. Further the sprockets 36 remove tension from the belt ahead of them to form the loop 38. Thus the belt is fed to the first drum from the loop 38 under tension which is very close to zero.

The fact that the surface speed of the drums 12 and 13 at each loop of the belt is faster than the surface speed of the drum at the next succeeding loop is a specific feature of the present invention. Where frusto-conical drums are employed as in FIGURE 1, the differential surface speed at spaced longitudinal points results from the taper in the drum.

It is also desired that the differential in the surface speed of the drum between successive loops along the drum surface 12 be the same as the differential in surface speed between the last loop on the drum 12 and the first loop on the drum 13. Thus the drum 13 is driven more slowly than the drum 12. To that end, the sprocket 18 is smaller than the sprocket 19. The difference in sprocket size is such that the desired relationship between the surface speed of the respective drums might be maintained.

An important advantage of the invention is the fact that the belt may be driven much more smoothly and under substantially lower tension than heretofore available systems. In conventional systems there is a definite relationship between the tension on the belt and the combined weight of the belt and the material being conveyed. In general the tension on the belt is not less than about 10% of such combined weight. Thus the longer, and therefore heavier, the belt, the greater the tension. With the present invention, however, the tension on the belt is independent of belt length. There is not necessarily any fixed relationship between belt tension and the combined weight of the belt and the material being conveyed. Indeed, in lengthy conveyors it has been found that tension on the belt with the present invention may be less than one percent of the combined weight of the belt and the material being conveyed.

The fact that the present friction drive tends to remove tension from the belt rather than add tension to the belt facilitates this advantageous result. At each loop of the belt around the drums 12 and 13, the surface speed of the drum is such as to tend to provide more belt than is necessary at the next succeeding loop where the surface speed is lower. As the result there is little or no tendency for the belt to become cinched around the drum surface.

The smoother low tension drive of this invention not only diminishes wear but has less tendency to cause articles being conveyed from shifting position on the belt.

In some installations it may be desirable to pass each loop of the belt around a pair of spaced frusto-conical driving drums. In such an installation, the belt does not pass completely around each drum in a helical path but passes between and around both drums at every loop. With this arrangement, the two spaced drums would be tapered in the same direction which would be the direction of travel of the belt along the drums.

Moreover, where the arrangement of belt loops just described is employed, each tapered drum may be replaced by a plurality of spaced driving wheels of progressively diminishing diameter, as shown in FIGURE 4 of the drawings. Here a pair of drives 101 and 102 are provided. Each drive includes a shaft 103 and plurality of vertically spaced driving wheels 104. Each of the belt loops passes between and around both of the drives 101 and 102. After the belt 11 leaves the top of the drives 101 and 102, it may be passed in a vertical run (not shown) to the bottom of such drives to complete the endless path.

Each of the driving wheels 104 in each drive is larger in diameter than the next succeeding wheel. If desired, the wheels 104 may be flanged so that the belt remains at the same elevation in its curved path around the wheel periphery. The rise in the belt would then occur solely in the straight run between the drives 101 and 102.

The important common characteristic between the spaced wheel drives of FIGURE 4 and the drum drives is the fact that the driving surface at each of the loops moves at a speed faster than the driving surface at the next succeeding loop. It can be seen that the same effect can be achieved by using spaced wheels 104, all of the same diameter, but driven at progressively diminishing angular velocities at successive loops in the belt. To that end, multiple concentric shafts could be employed to drive the constant diameter wheels at the different angular velocities.

A modified embodiment of a conveyer system according to the invention is shown in FIGURES 5 to 10, inclusive. The modified system includes a conveyor belt 111 the construction of which is shown in detail in FIGURE 8. This belt is made of metallic links collapsibly connected together to enable the belt to bend in either edgewise direction as described hereinafter and in greater detail in Patent No. 3,225,898.

As shown in FIGURE 5 the belt 111 is passed in a helical configuration successively around each of a pair of upright driving drums 112 and 113. The belt first is moved helically curving edgewise around the drum 112 through a plurality of vertically spaced loops. Each of the loops is contiguous to the drum throughout its length. At the top of the uppermost loop on the drum 112 the belt is passed to the drum 113 and there passes successively in edgewise curving helical movement through a plurality of vertically spaced loops which are contiguous to the drum 113 throughout the length of such loops. As described more fully hereinafter, the radially inner edge of the belt is driven by sliding frictional engagement with the peripheral driving surface of each drum.

The drum 112 is driven by an electric motor 114 through a transmission 115 which terminates in a spur gear 116 engaging a ring gear 117 around the inner periphery of the top of the drum 112. Similarly, the drum 113 is driven by an electric motor 121 through a transmission 122 which terminates in a spur gear 123 which engages a ring gear 124 around the inner periphery of the top of drum 113. To insure the driving of the drums 112 and 113 at precisely the same rate of speed the ring gears 117 and 124 are interconnected by a transmission 125 which comprises a series of shafts and gears positively interconnecting the drums 112 and 113.

A power takeoff transmission 126 connects the ring gear 117 with a supplemental driving sprocket 127 which positively engages the belt 111. The transmission 126 includes a clutch 128 which may be engaged or disengaged as desired. A similar transmission 131 connects a motor 121 with a supplemental driving sprocket 132 which positively engages the belt 111. Transmission 131 includes a clutch 133.

Still another power takeoff transmission 134 connects the ring gear 124 of drum 113 with a supplemental driving sprocket 135 which also positively engages the belt 111. It will be understood that various alternative driving connections may be provided between the two drums and the various supplemental driving sprockets. For example, the transmission 126 may be connected directly to the motor 114 instead of the ring gear 117. The transmission 131 may be connected directly to the ring gear 124 instead of the motor 121. If desired, the motors 114 and 121 may be replaced by a single more powerful driving motor connected to both of the drums 112 and 113. Any of the alternative power and transmission arrangements should positively interconnect the two drums and the three supplemental driving sprockets to drive the drums at precisely the same speed and the drive sprockets at a uniform speed properly correlated with the drum speed.

As shown in FIGURE 7 the drum 112 is journalled in bearings 142 mounted in a supporting frame 143. Also connected to the frame 143 are a series of brackets 144 which support a helical trackway 145 which engages and supports the undersurface of the belt 111. The trackway 145 preferably is made of nylon or other synthetic resinous plastic material having a smooth surface which provides a relatively low coefficient of friction with respect to the undersurface of the belt 111 which is engaged by the trackway. The trackway could be provided with rollers to support the belt but this would add substantially to cost.

The drum 113 is carried in an identical supporting frame 143 and is provided with an identical helical trackway 145 to support the belt in its travel through the helical loops around drum 113. The trackway 145 may be extended if desired to support the belt during any portion of its travel away from the helical loops around the drums.

Each of the drums 112 and 113 is constructed in the form of a cage with top and bottom members 146 and 147 respectively, which are connected by a series of vertical driving bars 148 positioned around the periphery of the drum at circumferentially spaced locations. Each of the bars 148 is circular in cross section as shown in FIGURE 8. The bars may be made of high carbon steel of similar material. As shown in FIGURE 8 the bars 148 engage in frictional driving relationship the radially inner edge of the belt.

The belt 111 comprises a plurality of transverse rods 151 which interconnect a plurality of U-shaped connector members 152 which slidably nest within each other and enable the belt to be collapsed along either edge. The members 152 are slotted to receive the rods 151 thus permitting the collapse of the edges of the belt. At the extreme outer edge of each of the rods 151 outside of the connector members 152, there is an arcuate dome-shaped protrusion 153. These protrusions may be formed by a welding operation to secure the ends of the rods 151 with respect to the connector members 152. It is the frictional driving engagement between the drum bars 148 and the arcuate protrusions 153 which provide the primary drive for the belt 111. Desirably, the radius of each of the drum bars 148 relative to the radius and spacing of the arcuate protrusions 153 is such that the peripheral surface of each bar 148 engages only the arcuate protrusions 153 and does not touch the sidewall of the connector member 152 between the protrusions. It is desirable, however, that the surface of the bar 148 extend as close as possible to the connector members 152 without actually touching them. This construction of the bars 148 and the edge of the belt 111 provides a relatively high coefficient of friction therebetween.

As a consequence the coefficient of friction between the periphery of the drum 153 and the radially inner edge of the belt 111 is relatively high as compared to the coefficient of friction between the trackway 145 and the undersurface of the belt 111. More specifically, these coefficients of friction are correlated as previously described to maintain the belt throughout the helical loops at a magnitude of tension less than the tension which would cause one edge of the belt to be raised above the other edge during operation.

The path of the belt 111 between the lower portions of the drums 112 and 113 is shown in FIGURES 5 and 6. When the belt is driven in the direction of the arrows shown in FIGURE 6 it passes around the supplemental drive sprocket 127 past a loading station 154. From there the belt approaches the drum 112 tangentially and passes edgewise around a horizontal curve to begin its ascent up its helical path around the drum 112. After leaving the top of drum 112 the belt passes between the tops of the two drums past the supplemental drive sprocket 135 as shown in FIGURE 5. The belt then begins its descent through its helical path around the drum 113. Next the belt is passed tangentially from the bottom of the drum 113 to a discharge station 155 as shown in FIGURE 6. The belt then passes around supplemental drive sprocket 132 and along a straight run to the lower end of the drum 112 opposite the initial point of engagement of the belt 111 with the drum after it leaves the loading station 154. The belt is then passed edgewise around a horizontal curve 156 in engagement with the bottom peripheral surface of the drum 112 after which it is passed tangentially along a straight run 157. The belt is then passed in a 180° flatwise turn around a reversing pulley 158. From there the belt is passed over an idler pulley 159 to the supplemental drive sprocket 127 and back to the loading station 154.

The passage of the belt flatwise around three reversing pulleys, namely the sprockets 127 and 132 and the reversing pulley 158, and the horizontal curves therebetween enables the opposing surfaces of the belt to be reversed with each conveying cycle. Thus wear of the belt is distributed between both its surfaces. The advantages of the reversing pulley arrangement and particularly its advantages in combination with a pair of drum drives are the same as previously described with respect to the embodiment of the invention shown in FIGURES 1 to 4.

In the embodiment shown in FIGURES 5 to 10 the conveyor system has loading and discharge stations spaced from each other. With this arrangement there can be no continuous conveying of articles repeatedly around both drums as is accomplished in the embodiment of FIGURES 1 to 4. It will be understood that the embodiment of FIGURES 1 to 4 may be provided with an arrangement as shown in FIGURE 6 to convey from a loading station to a discharge station. Correspondingly, the embodiment of FIGURES 5 to 10 may be provided with an arrangement as shown in FIGURE 2 to effect continuous conveying around the drums.

The belt is driven by the combination of the primary driving drums 112 and 113 and the supplemental driving sprockets 127, 132 and 135. The primary drive is accomplished by sliding frictional engagement of the peripheral surface of each drum with the radially inner edge of the belt 111 at each of the loops of the belt around the drums. The supplemental drive is provided by a positive engagement of the teeth of the sprockets 127, 132 and 135 with corresponding openings in the edges of the belt. The supplemental positive drive supplied by the sprockets imparts a small tension on the belt sufficient to enable it to be frictionally driven by the drums 112 and 113. The supplemental drive sprockets move the belt at a speed which is slower than the surface speed of the drum at any point of contact with the belt. Thus there is constant relative sliding between the belt and each drum. At the same time as previously described, the tension imparted by the sprockets must not exceed the critical tension which will cause one edge of the belt to be elevated above the other. Therefore the coefficients of friction between the drum surfaces and the belt and between the supporting rails and the belt, respectively, must be correlated to enable the belt to be driven at all times below the critical tension.

The positive drive sprockets 127, 132 and 135 remove tension from the belt ahead of them so that the belt is fed to each drum under a tension which is very close to zero and in no event exceeds the critical tension previously described.

The motors 114 and 121 are reversible to drive the drums 112 and 113, respectively, in opposite directions. When it is desired to pass the belt up the drum 112 and down the drum 113, the motor 114 is driven to rotate the drum 112 in a counterclockwise direction as viewed in FIGURE 5. The motor 121 is operated in a direction to rotate the drum 113 in a clockwise direction to move the belt down that drum. When the motors are reversed the drum 113 rotates counterclockwise and the drum 112 rotates clockwise to move the belt up the drum 113 and down the drum 112. When the belt is so driven the discharge station 155 becomes the loading station and the loading station 154 becomes the discharge station.

When the belt is operated to transport it up the drum 112, the drive sprocket 127 removes tension from the belt, thus collapsing the belt so that it approaches the drum 112 under a very low tension. Preferably the tension is zero, and in no event may it be higher than the critical tension previously described. The clutch 133 may be disengaged so that the drive sprocket 132 at the discharge station becomes merely an idler.

When the belt is driven in the opposite direction so that it travels up the drum 113 the drive sprocket 132 removes tension from the belt, thus collapsing it so that it approaches the drum 113 under very low and preferably zero tension. In that event the clutch 128 may be disengaged to convert the drive sprocket 127 into an idler. The drive sprocket 135 is operated regardless of the direction of travel of the belt to remove tension from the belt as it approaches the top of the drum down which it will pass. As in the case of the other drive sprockets, the drive sprocket 135 reduces the tension in the belt so that it approaches the respective drum under a tension which is less than the critical tension and preferably zero or very close to zero.

Figure 9:
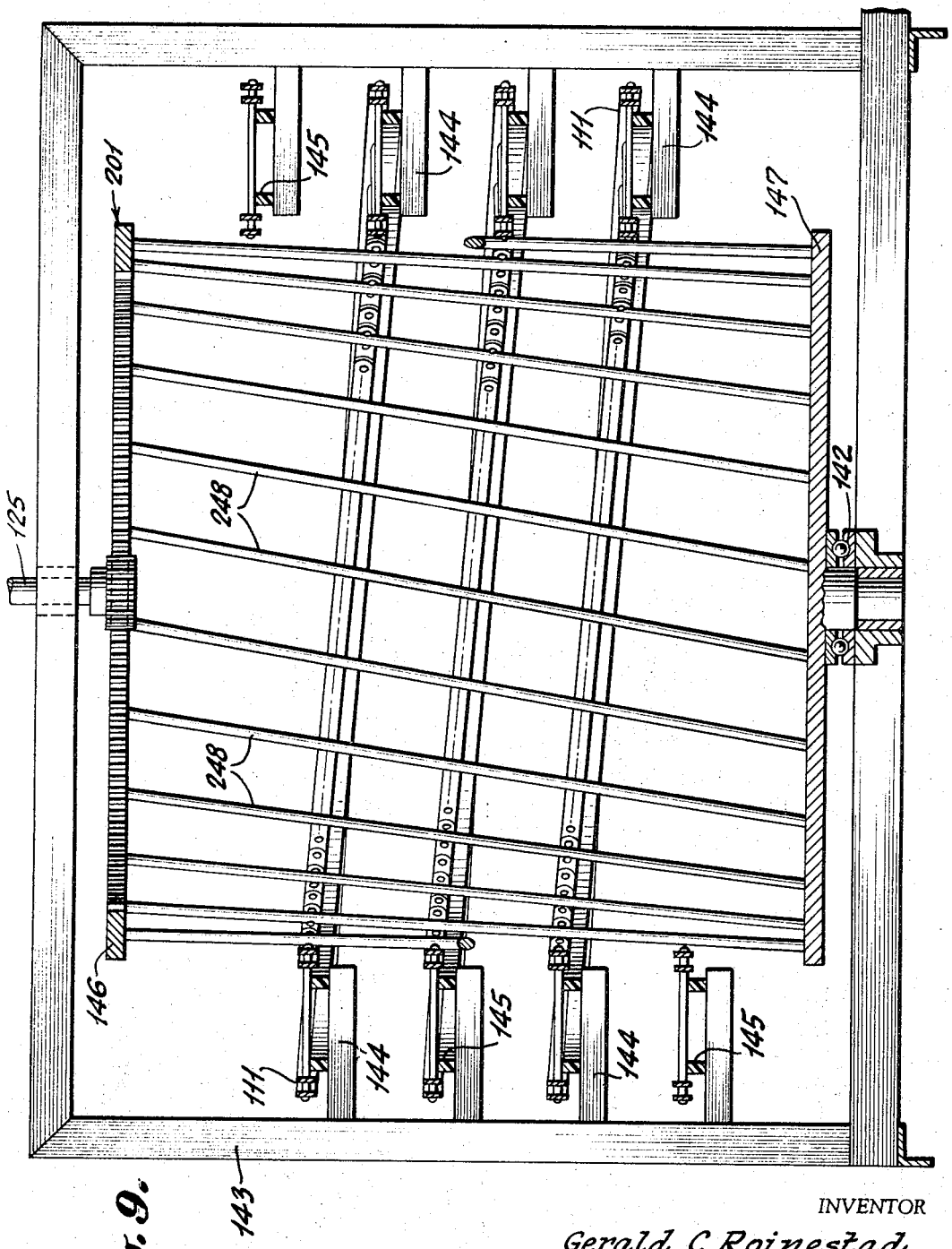
FIGURE 9 is a vertical section similar to FIGURE 7 showing a modified form of a driving drum utilizing inclined driving rods.

Shown in FIGURE 9 is an alternative form of driving drum 201 which may be substituted for the drum 112 and 113. The sole difference between the drum 201 and the drums 112 and 113 resides in the inclination of the driving bars from the vertical in the drum 201. In other respects, the drums and their supporting frames are identical and are given identical reference numerals. It can be seen in FIGURE 9 that the driving bars 248 of the drum 201 are inclined so that the upper ends of the driving bars extend in the direction of the decline of the contiguous helical loops of the belt. The direction of the inclination is toward the decline of the contiguous belt loops whether the drum is to be rotated in one direction to drive the belt down the drum or in the opposite direction to drive the belt up the drum. For clarity, there is shown in FIGURE 10 a developed view of three adjoining driving bars 248 and a short length of the contiguous helical loop of the belt 111. Desirably, the inclination of the bars 248 from the vertical is somewhat greater than the inclination of the helical belt loops from the horizontal. The purpose of the inclination can best be described by a comparison between the operation of vertical driving bars 148 as shown in FIGURE 7 and inclined driving bars 248 as shown in FIGURES 9 and 10. When the vertical bars 148 are moved relative to the rails 145 to move the belt down the drum the direction of the force exerted by the bars is circumferential, that is, in a plane which is perpendicular to the axis of the drum. At the same time the movement of the belt 111 is inclined downwardly with respect to the circumferential direction. Thus the force exerted by the bar tends to exert an upward camming action on the protrusions 153 tending to lift the inner edge of the belt up off of the rail 145. This action increases the tendency for the inner edge of the belt to hang up on the drum.

Correspondingly, when the drum is rotated in a direction to move the belt up the drum the camming force exerted by the vertical bars against the inner edge of the belt tends to force the inner edge downwardly into the rails. This action increases the tendency to raise the outer edge of the belt.

With reference to FIGURE 10, when the inclined driving bars 248 are moved relative to the belt to move the belt down the drum, the bars still move circumferentially relative to the drum and thus at an angle to the belt. But the inclined bars exert a camming action which tends to force the belt downwardly against the rails and thus to cancel or minimize the tendency for the circumferential movement of the bars to raise the inner edge of the belt. Correspondingly, when the bars 248 are moved in a direction to drive the belt up the drum the inclination of the bars produces a camming effect tending to raise the inner edge of the belt thereby canceling or minimizing the effect of the circumferential movement of the rods tending to urge the belt downwardly. Normally, the inclination of the belt loops from the horizontal is at a small angle which might be from three to five degrees. It has been found that an acceptable inclination of the driving bars from the vertical is about twice the slope of the belt loops. Specifically, as illustrated in FIGURE 10 where the downward inclination of the belt is about five degrees, the inclination from the vertical of the driving bars is about ten degrees.

The inclination of the bars 248 has yet another effect. As stated the belt constantly slips backward relative to the drum periphery. Thus the protrusions 153 slide over the vertical bar surfaces. If the bars are inclined as described, however, the backward slippage is matched in whole or in part by the backward inclination of the bars as the belt moves up or down the drum. The inclination can be selected so that the horizontal or circumferential distance between the top and bottom of each driving bar is equal to the circumferential slippage of the belt during its path from one end of the drum to the other. In that event the protrusions 153 will merely slide along the bars and will not slip over them.

Figure 12:
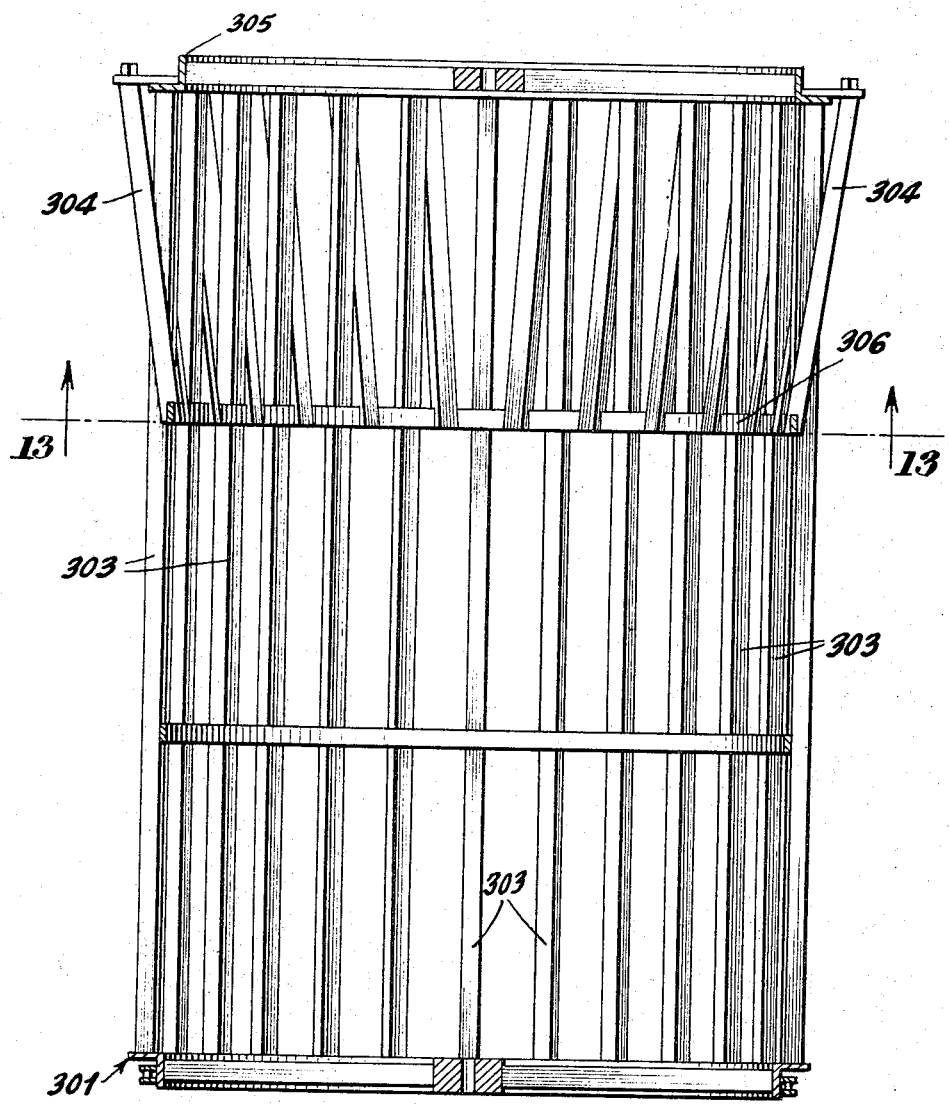
FIGURE 12 is a sectional view of one of the drums of FIGURE 11 to an enlarged scale.
Figure 13:
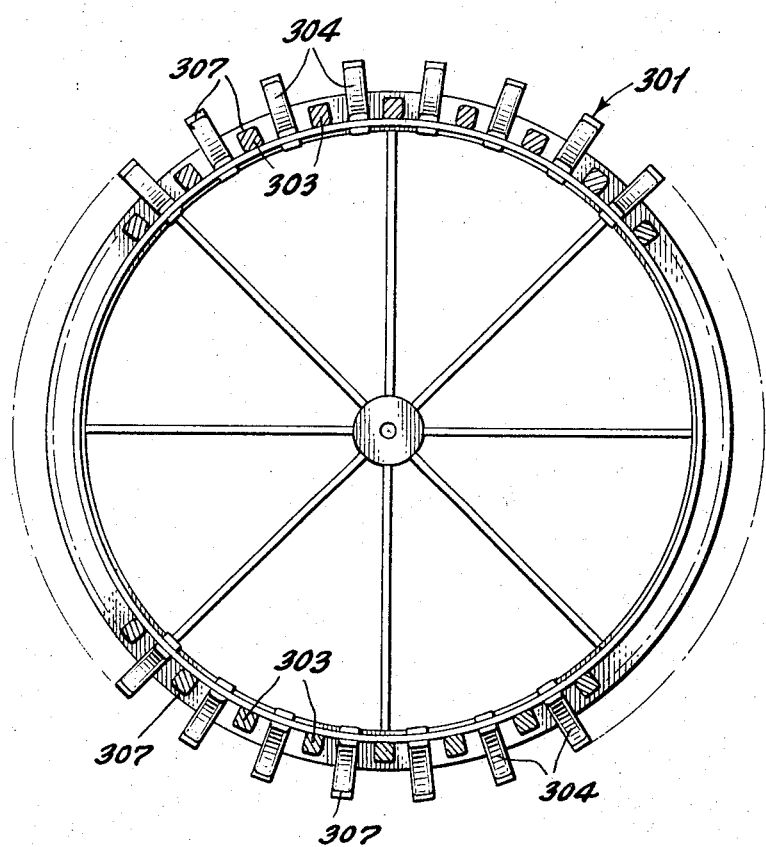
FIGURE 13 is a horizontal section taken along the line 13—13 of FIGURE 12.

Shown in FIGURES 11 to 13 is another alternative form of driving drums 301 and 302 which may be substituted for the drums 112 and 113. The drums 301 and 302 differ from the drums 112 and 113 in two major respects. First, the driving bars 303 of the drums 301 and 302 are generally rectangular in cross section with rounded corners as best shown in FIGURE 13, whereas the driving bars 148 are circular in cross section. Secondly, the drums 301 and 302 are tapered at their belt entrance ends in the direction of movement of the belt axially of its helical path. Specifically, the drum 301, around which the belt 311 moves downwardly, has a tapered upper end. This taper is formed by mounting between the upper ends of the driving rods 303, a plurality of tapered driving rods 304 which are connected to the drum between the upper end ring 305 and an intermediate ring 306. The ends of the tapered rods 304 may be connected to the rings 305 and 306 by bolting, welding or any other suitable fastening. The tapered rods 304 should extend over the first two or three loops of the belt as it descends around the drum. The rods preferably have a slope of from 6 percent to 8 percent or from 1¼ to 1¾ inches per foot relative to the drum axis.

The tapered entrance end of the drum has several advantages. First, it imparts a downward force component to prevent the inside edge of the belt from hanging up on the drum during the important first few loops around the drum. Secondly, since the tapered portion of the drum has a larger diameter than the cylindrical portion of the drum, the ratio of overdrive of the cylinder surface to the belt edge is increased on the tapered surface with a resultant increase in the effective coefficient of friction between the drum surface and the belt edge. Thus, there is a more rapid lowering of the belt tension during the first few loops around the drum which further diminishes the possibility of the inner edge of the belt hanging up on the drum.

With reference to FIGURE 11 is will be observed that the use of the taper on the down drum eliminates the necessity for a sprocket drive along the portion of the belt which extends from the top of the drum 302 to the top of the drum 301. Such a drive is shown for example in FIGURE 5 between the drums 112 and 113. The purpose of the drive 135 as shown in FIGURE 5 is to remove tension from the belt as it approaches the down drum. Since the tapered entrance end of the drum very rapidly removes the tension from the belt, the need for a drive between the upper ends of the two drums is eliminated.

The use of the tapered entrance end of the drum is much more important on the down drum 301 than on the up drum 302. Thus, the tapered entrance end of the drum 302 can be eliminated leaving that drum entirely cylindrical while retaining the tapered entrance end of the drum 301.

With reference to FIGURE 13, the driving bars 301, 302, and 304 are all generally rectangular in configuration. Thus, the outer surface of each of these driving bars is flat. Desirably, that flat surface which contacts the belt is sufficiently long to support two adjacent belt stitches at one time. Thus, the length of the surface 307 of each of the driving rods circumferentially of the drum should be longer, and preferably about one and one quarter times longer, than the distance between the protrusions 153 (FIGURE 8) which latter distance defines the pitch of the belt links. Although the outer surface of the driving rods preferably is flat, the corners desirably are rounded to insure smooth operation. The flattened outer surface can be obtained by using square, rectangular or other polygonal tubing as well as angle, channel or flat stock. In each instance, the belt engaging outer surface of the rod is flat with the corners rounded.

In all respects other than those described, the conveyor system shown in FIGURES 11 to 13 is similar in its structure and operation to the conveyor system of FIGURE 5.

In each of the three embodiments disclosed respectively in FIGURES 1 to 4, FIGURES 5 to 10, and FIGURES 11 to 13, there is the requisite correlation between the coefficient of friction F between the drum and the belt and the coefficient of friction $f$ between the supporting rails and the belt, the speed of operation of the drums and the speed of operation of the supplemental drives. This correlation is such as to maintain the belt throughout the loops around both drums at a magnitude of tension less than the critical tension which would cause one edge of the belt to be raised above the other edge, while at the same time to maintain said magnitude of tension sufficient to permit the belt to be smoothly driven by the drums at a speed slightly less than the speed of the contiguous drum surface, and further to feed the belt to an initial point on each drum in its path through the loops at a tension not greater than such critical tension and preferably zero or very close to zero.

The preferred embodiments are those of FIGURES 6 to 10 and 11 to 13 where the drum surface is truly cylindrical. In these embodiments there is a very high coefficient of friction between the drum and the edge of the belt as compared to the relatively low coefficient of friction between the supporting rails and the belt. With this arrangement the belt is driven with very little overdrive, i.e., very little slippage between the belt and the drum surface.

On the other hand, with the embodiment in FIGURES 1 to 4, there is a substantial amount of overdrive. Moreover, the degree of overdrive varies with each successive loop as the diminishing diameter of the drum tends to remove tension as the belt progresses through the successive loops. With this embodiment there need not be quite as great a differential in the coefficients of friction F and $f$. The reason is that the critical tension which causes one edge of the belt to be raised is higher in such a system. At the same time the high degree of overdrive results in a greater tendency of the belt to alternately stick and slip along the surface of the driving drums and increases the endency to set up vibration waves in the belt. While both systems when perfectly correlated will perform adequately, it has been found that the systems shown in FIGURES 6 to 10, and FIGURES 11 to 13 operate somewhat more smoothly.

The cage construction of the driving drums in the several embodiments of FIGURES 5-13 which drums employ spaced driving rods or bars is especially preferred. The belt must move both circumferentially around the drum and axially up or down the drum surface. With the cage construction the effective coefficient of friction in the circumferential direction is much higher than in the axial direction. This ratio is desirable because the belt should slide freely up or down the drum. These two coefficients of friction would be substantially identical in a solid surface cylinder which is thus less desirable.

There has been illustrated and described what is considered to be several preferred embodiments of the invention. It will be understood, however, that various modifications may be made without departing from the scope of the invention which is defined solely by the appended claims.

What is claimed is:

1. A conveyor system which comprises
   an endless flat belt made up of a plurality of links collapsibly connected together to permit the belt to bend in an edgewise direction, and
   a belt driving and supporting assembly comprising
      rotatable friction driving means comprising an upright drum having a circular cross section and a peripheral driving surface,
      supporting means engaging the underside of said belt to support said belt for helical movement curving edgewise around said drum successively through a plurality of vertically spaced loops contiguous to said drum throughout their length, the radially inner edge of said belt being in sliding frictional engagement with said driving surface, and
      supplemental driving means engaging said belt,
      said driving and supporting assembly comprising tension control means with said drum driving surface having a coefficient of friction relative to said belt correlated with the coefficient of friction of said supporting means relative to said belt to maintain said belt throughout said loops at a magnitude of tension less than the tension which would cause one edge of the belt to be raised above the other edge and with said supplemental driving means maintaining said magnitude of tension sufficient to permit the belt to be smoothly driven by said drum by frictional engagement between said driving surface and the radially inner edge of the belt at a speed slightly less than the speed of the contiguous drum surface and feeding the belt to an initial point in its path through said loops at a tension not greater than said magnitude.

2. A conveyor system according to claim 1 wherein said upright drum is tapered in the direction of movement of said belt axially of its helical path.

3. A conveyor system according to claim 2 wherein said drum is tapered only at its belt entrance end, the remaining surface of said drum being parallel to the drum axis.

4. A conveyor system according to claim 2 wherein said drum is tapered throughout its length.

5. A conveyor system according to claim 1 wherein said upright drum comprises a cage with spaced upright bars, said radially inner belt edge is characterized by spaced protrusions which are engaged by said bars.

6. A conveyor system according to claim 5 wherein said bars have a flat surface on the drum periphery with slightly rounded corners.

7. A conveyor system according to claim 5 wherein said drum is tapered only at its belt entrance end, the remaining surface of said drum being parallel to the drum axis.

8. A conveyor system according to claim 5 wherein said supporting means has a belt engaging surface of smooth synthetic plastic material.

9. A conveyor system according to claim 5 wherein said bars are inclined so that the upper ends of said bars extend in the direction of the decline of said helical loops.

10. A conveyor system which comprises
an endless flat belt made up of a plurality of links collapsibly connected together to permit the belt to bend in an edgewise direction, and
a belt driving and supporting assembly comprising
rotatable friction driving means comprising a pair of horizontally spaced upright drums each having a circular cross section and a peripheral driving surface,
supporting means engaging the underside of said belt to support said belt for helical movement upwardly around one of said drums and downwardly around the other of said drums, said helical movement on each drum being successively through a plurality of vertically spaced loops contiguous to the respective drum throughout their length, said belt loops being curved edgewise with the radially inner edge of said belt being in sliding frictional engagement with the drum driving surfaces, and
supplemental driving means engaging said belt,
said driving and supporting assembly comprising tension control means with each of said drum driving surfaces having a coefficient of friction relative to said belt correlated with the coefficient of friction of said supporting means relative to said belt to maintain said belt throughout said loops at a magnitude of tension less than the tension which would cause one edge of the belt to be raised above the other edge and with said supplemental driving means maintaining said magnitude of tension sufficient to permit the belt to be smoothly driven by said drums at a speed slightly less than the speed of the contiguous drum surface and to feed the belt to an initial point in its path through said loops at a tension not greater than said magnitude.

11. A conveyor system according to claim 10 further comprising a reversing pulley about which the belt makes a flatwise 180° turn, the total number of flatwise direction reversals made by said belt, including the direction reversal about said reversing pulley, being an odd number of at least one, whereby the flat surfaces of said belt are reversed with sucessive conveying runs.

12. An apparatus according to claim 10 wherein said rotatable friction drive means and said supplemental drive means are reversible to drive said belt in either longitudinal direction.

13. A conveyor system according to claim 10 wherein each of said upright drums is tapered in the direction of movement of said belt axially of its helical path.

14. A conveyor system according to claim 13 wherein said drums are tapered at their belt entrance ends only, the remaining surface of each drum being parallel to the drum axis.

15. A conveyor system according to claim 10 wherein the drum around which said belt moves downwardly is tapered at its belt entrance end in the direction of movement of the belt axially of its helical path.

16. A conveyor system according to claim 10 wherein said taper terminates intermediate the ends of said tapered drum and the remaining surface thereof and the entire surface of the other drum are parallel to the axes of said drums.

17. A conveyor system according to claim 10 wherein each of said upright drums comprises a cage with upright bars and said radially inner belt edge is characterized by spaced protrusions which are engaged by said bars.

18. A conveyor system according to claim 17 wherein the drum around which said belt moves downwardly is tapered at its belt entrance end in the direction of movement of the belt axially of its helical path.

19. A conveyor system according to claim 18 wherein said taper terminates intermediate the ends of said tapered drum and the remaining surface thereof and the entire surface of the other drum are parallel to the axes of said drums.

20. A conveyor system according to claim 17 wherein said bars and protrusions are generally arcuate and said bars engage adjoining protrusions without engaging the belt edge between said protrusions.

21. A conveyor system according to claim 20 wherein said bars have flat outer surfaces defining the drum periphery with slightly rounded edges.

22. A conveyor system according to claim 17 wherein said supporting means has a belt engaging surface of smooth synthetic plastic material.

23. A conveyor system according to claim 17 wherein said bars are inclined so that their upper ends extend in the direction of the decline of said helical loops.

24. An apparatus according to claim 23 wherein said rotatable friction drive means and said supplemental drive means are reversible to drive said belt in either longitudinal direction.

25. A conveyor system which comprises
an endless flat belt made up of a plurality of links collapsibly connected together to permit the belt to bend in an edgewise direction,
means to support said belt for movement through an endless path including a plurality of vertical spaced loops with the belt curved in an edgewise direction in each loop,
rotatable friction driving means providing a curved peripheral driving surface in sliding frictional engagement with a radially inner edge of said belt at each of said loops, said friction driving means being constructed to move the driving surface at each of said loops at a faster speed than the driving surface at the next succeeding loop as the belt passes successively through said loops, and
means to maintain said belt in sufficient tension to enable it to be driven by said sliding frictional engagement.

26. A conveyor system according to claim 25 wherein said means to maintain said belt in tension comprises a positive drive which moves the belt at a speed less than the surface speed of the driving surface at any of said loops.

27. A conveyor system according to claim 25 wherein said friction drive comprises a rotatable drum having a frusto-conical surface in said sliding frictional engagement with said belt at each of said loops and means to rotate said drum.

28. A conveyor system according to claim 25 wherein said friction drive comprises a pair of horizontally spaced frusto-conical drums and means to rotate each of said drums about an upright axis, said drums having their peripheral surfaces tapered in opposite directions with said belt moving in a helical path successively around each drum in said frictional driving engagement with said drum surfaces and in the direction of the taper in each drum.

29. A conveyor system according to claim 25 wherein said friction drive comprises a plurality of driving wheels driven concentrically at successively diminishing surface speeds at vertically spaced locations about an upright axis, each of said wheels having its peripheral surface in said driving engagement with the belt.

30. A conveyor system according to claim 25 wherein said wheels have successively smaller diameters and are driven at the same angular speed.

31. A conveyor system which comprises
an endless flat belt made up of a plurality of links collapsibly connected together to permit the belt to bend in an edgewise direction, a pair of horizontally spaced frusto-conical driving drums tapered in opposite directions, said belt being curved edgewise in a helical configuration around and in sliding frictional engagement with the periphery of each of said drums in turn, a track means supporting said belt in said configuration, means to rotate said drums at different speeds so that the surface speed at the small end of one drum is greater than the surface speed at the large end of the second drum, and positive drive means engaging said belt between the small end of said second drum and the large end of said first drum to maintain said belt in sufficient tension to enable it to be driven by said sliding frictional engagement.

32. A conveyor system according to claim 31 further comprising a reversing pulley about which the belt makes a flatwise 180° turn, said belt making a first edgewise turn from its normal path in the system to approach said reversing pulley and a second edgewise turn departing from said reversing pulley to resume said normal path, said first and second turns being at about the same elevation in the system, whereby the flat surfaces of said belt are reversed with successive conveying runs.

33. A conveyor system according to claim 32 wherein said positive driving means is at said reversing pulley and said first and second edgewise turns are around said driving drums.

34. A conveyor system according to claim 33 wherein a plurality of pulleys are provided to guide said belt through a transfer point to effect continuous conveying of articles through successive cycles, said belt being passed to one side of said transfer point, then around said first edgewise turn to said reversing pulley, and around said second edgewise turn to the other side of said transfer point.

35. A method of driving an endless flat belt made up of a plurality of links collapsibly connected together to permit the belt to bend in an edgewise direction which comprises applying a frictional drag to the undersurface of said belt and supporting said belt along said undersurface in a helical configuration with the belt curving edgewise in a plurality of vertically spaced loops so that the radially inner edges of said loops define substantially a cylinder, applying a frictional driving force in a direction circumferentially of said cylinder to the radially inner edge of said belt substantially continuously throughout the length of said loops to move said belt longitudinally through said loops, applying a supplemental driving force to said belt and correlating said frictional driving force with said frictional drag to maintain said belt under a driving tension less than the tension which would cause one edge of the belt to be raised above the other edge and feeding said belt to an initial point in its path through said loops at a tension not greater than said driving tension.

36. A method according to claim 35 wherein said belt is fed to said initial point under substantially zero tension.

37. A method according to claim 35 wherein said belt has a series of closely spaced protrusions along its radially inner edge and said frictional driving force is applied only against said protrusions.

38. A method according to claim 35 wherein said cylinder is slightly tapered in the direction of movement of the belt axially of said cylinder.

39. A method of driving an endless flat belt made up of a plurality of links collapsibly connected together to permit the belt to bend in an edgewise direction which comprises applying a frictional drag to the undersurface of said belt and supporting said belt along said undersurface in a configuration defining a pair of horizontally spaced upright helices with the belt curving edgewise in a plurality of vertically spaced loops extending upwardly around one and downwardly around the other of said helices so that the radially inner edges of said loops define substantially a pair of cylinders, applying a frictional driving force in a direction circumferentially of the respective cylinders to the radially inner edge of said belt substantially continuously throughout the length of said loops to move said belt longitudinally through said loops, applying a supplemental driving force to said belt and correlating said frictional driving force with said frictional drag to maintain said belt under a driving tension less than the tension which would cause one edge of the belt to be raised above the other edge and feeding said belt to an initial point in its path through said loops at a tension not greater than said driving tension.

40. A method according to claim 39 wherein said belt is fed to said initial point under substantially zero tension.

41. A method according to claim 39 wherein said belt has a series of closely spaced protrusions along its radially inner edge and said frictional driving force is applied only against said protrusions.

42. A method acording to claim 39 wherein said cylinder is slightly tapered in the direction of movement of the belt axially of said cylinder.

References Cited
UNITED STATES PATENTS 3,269,142   8/1966   De Mola et al. _____ 198—136 X EDWARD A. SROKA, *Primary Examiner.*